May 14, 1957  H. C. SCHINK  2,792,010
FLUID PRESSURE RELAY
Filed May 23, 1955  3 Sheets-Sheet 1

INVENTOR.
HOWARD C. SCHINK
BY
Raymond W. Junkins
ATTORNEY

May 14, 1957  H. C. SCHINK  2,792,010
FLUID PRESSURE RELAY
Filed May 23, 1955  3 Sheets-Sheet 2

INVENTOR.
HOWARD C. SCHINK
BY
Raymond W. Junkins
ATTORNEY

May 14, 1957  H. C. SCHINK  2,792,010
FLUID PRESSURE RELAY

Filed May 23, 1955  3 Sheets-Sheet 3

INVENTOR.
HOWARD C. SCHINK
BY
Raymond W. Jenkins
ATTORNEY

United States Patent Office 2,792,010
Patented May 14, 1957

2,792,010

FLUID PRESSURE RELAY

Howard C. Schink, Waterford, Conn., assignor to Bailey Meter Company, a corporation of Delaware Application May 23, 1955, Serial No. 510,188

5 Claims. (Cl. 137—85)

This invention relates to control systems for maintaining conditions such as pressure, temperature, level, electromotive force, or the like, at, or substantially at, a desired value by regulating the supply of an agent which produces, maintains or otherwise affects the condition magnitude.

The present invention is embodied in structure which varies the application of an agent, to a condition, in accordance with the first derivative of the magnitude of the condition with respect to time. Alternately expressed, the agent is varied in accordance with the rate of change in the magnitude of the condition it varies.

A finite change in the magnitude of a condition to be controlled must occur before a control system responsive to changes can establish a control effect which varies in proportion to the magnitude of a condition with respect to time, or in accordance with the first derivative thereof. The present invention is embodied in the structure of a control system which responds to this finite change in the magnitude of a condition. The control effect produced by the structure of the invention changes with sufficient rapidity over the interval when the condition is changing to correct the application of the agent before a material change appears in the magnitude of the condition affected by the agent.

From one viewpoint, the structure of the invention produces an effect which is a momentary emphasis of a condition change. Utilization of this effect permits a proper correction in the application of the agent to the condition to desirably control the magnitude of the condition before a change has become appreciable.

A primary object of the invention is to apply an agent to a condition in accordance with the first derivative of the magnitude of the condition with respect to time.

Another object of the invention is to restore a condition to a desired magnitude after departure therefrom.

Another object of the invention is to provide a structure which will respond to the rate of change in the magnitude of the condition to produce an effect which is a momentary emphasis of the condition change with subsequent reduction of the effect when the rate of change of the condition no longer increases.

Figure 1:
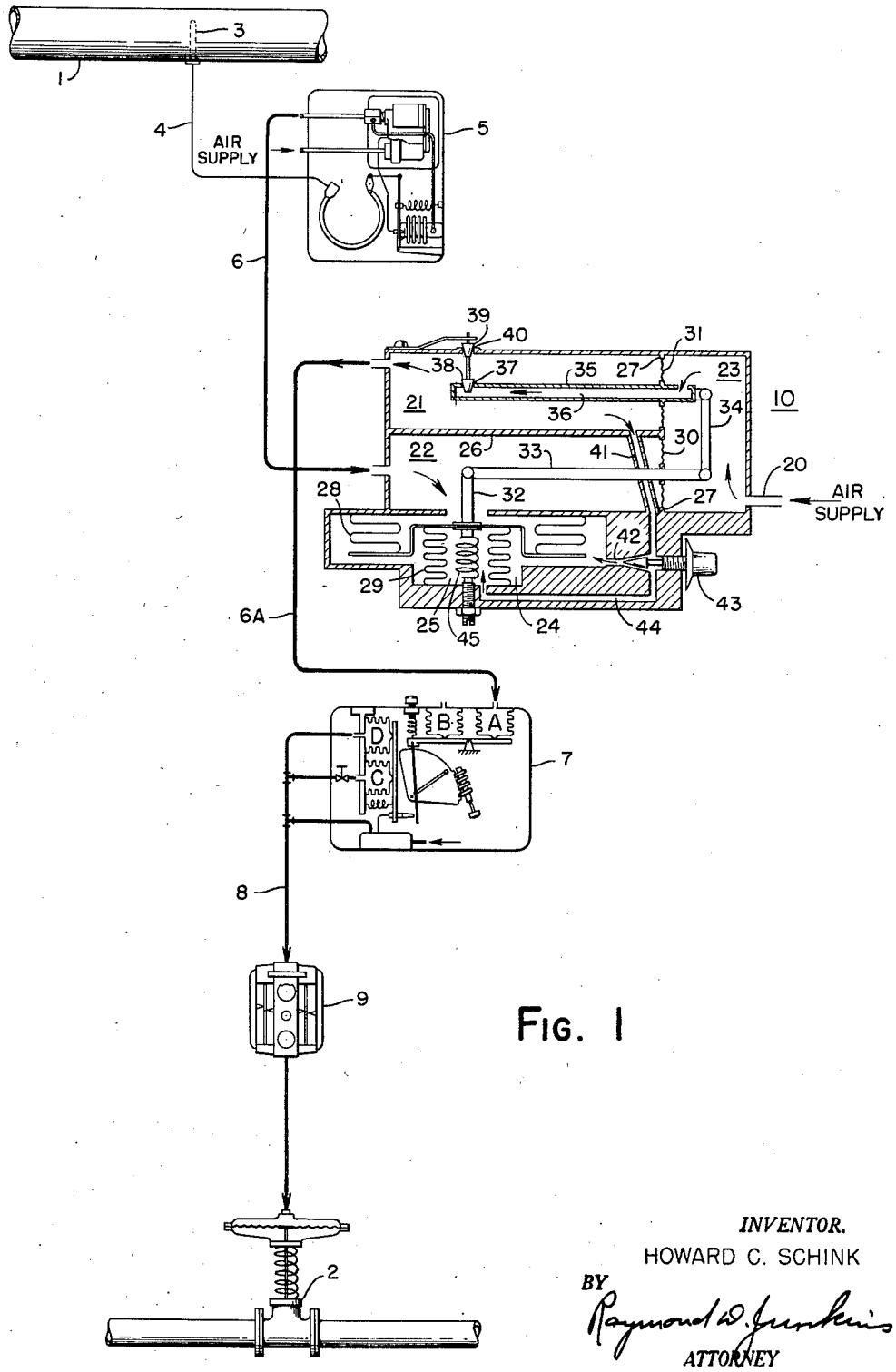
Fig. 1 is a diagrammatic illustration of a complete control system embodying the invention.
Figure 2:
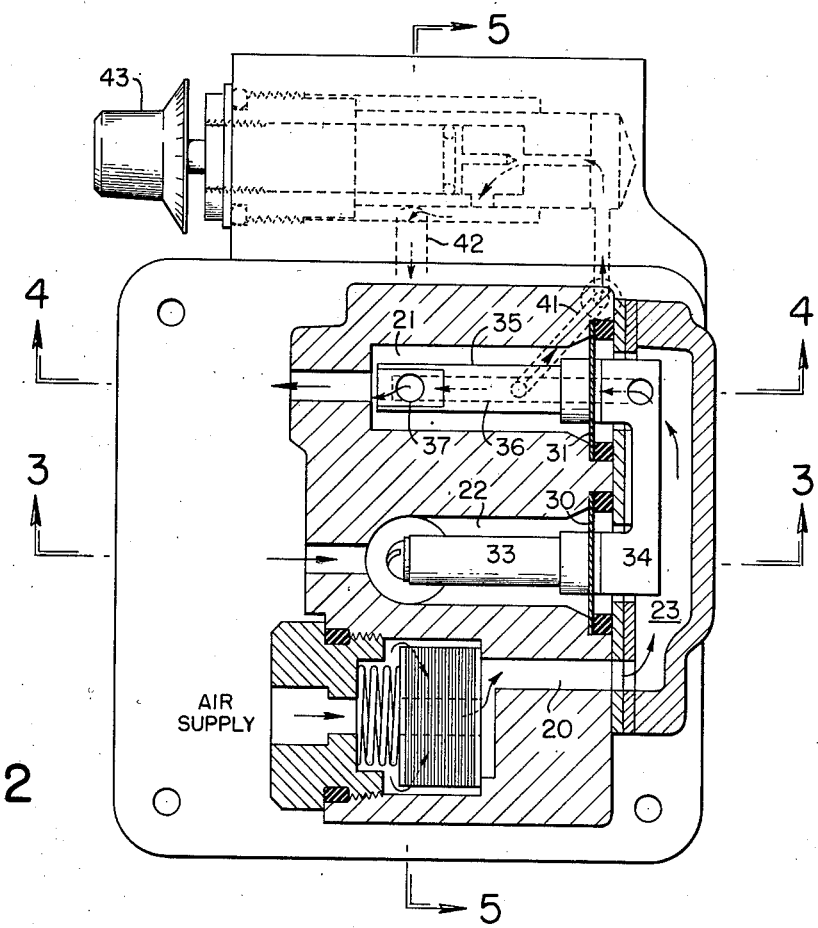
Fig. 2 is a sectioned plan view of one form of the relay structure embodying the invention, the section taken along the line 2—2 of Fig. 5.
Figure 3:
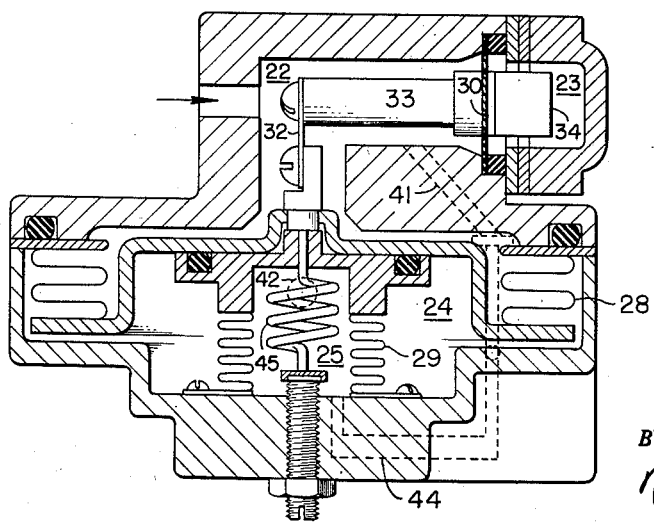
Fig. 3 is a sectioned elevation of the relay structure of Fig. 2 taken along line 3—3 of Fig. 2.
Figure 4:
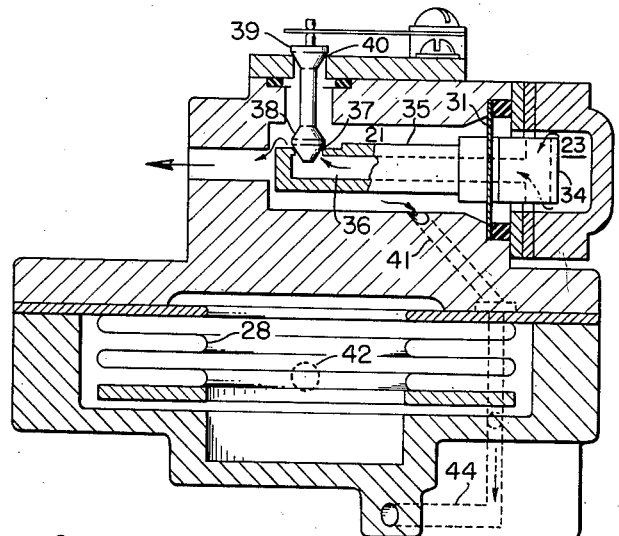
Fig. 4 is a section, along the line 4—4, of Fig. 2 in the direction of the arrows.
Figure 5:
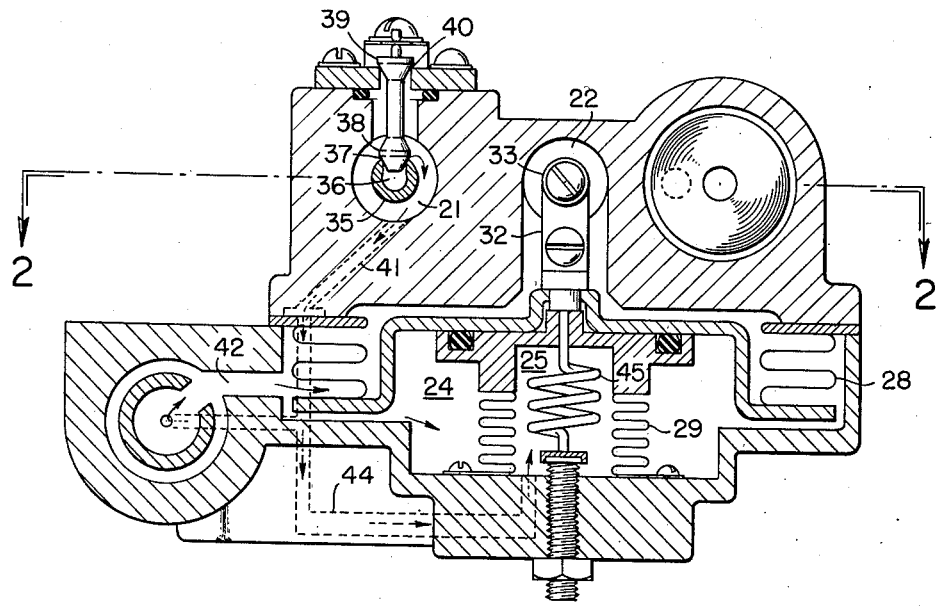
Fig. 5 is a section, along the line 5—5, of Fig. 2 in the direction of the arrows.

Referring to Fig. 1, there is shown a conduit 1 in which there is assumed to exist a variable condition, such as temperature, as a characteristic of a fluid medium flowing through the conduit. The temperature condition within conduit 1 is varied, or controlled, by the opening and closing of valve 2. The opening and closing of valve 2 controls an agent which is associated with the fluid medium in conduit 1 in such manner as to fluctuate the value of the temperature condition. It is to be appreciated that the variation of a temperature condition in conduit 1 may control a device, such as valve 2, in an agent supply line having no direct relationship with the fluid medium in conduit 1.

However, the simple and more obvious arrangement is assumed to illustrate the function of the system disclosed in Fig. 1. The magnitude of the temperature condition within conduit 1 is detected by means of a thermometric system comprising a bulb 3 whose temperature establishes a pressure, proportional to the temperature magnitude, effective by means of a capillary 4 upon a transmitter 5. Transmitter 5 is controlled by the pressure of pipe 4 to establish a fluid pressure, in turn, representative of the magnitude of the temperature to which bulb 3 is exposed.

In order to simplify and understand the system, transmitter 5 is given the form of the structure disclosed in Gorrie et al. S. N. 289,402, filed May 22, 1952, which issued March 13, 1956, as Patent 2,737,963. The instrument structure disclosed in that patent is characterized by a Bourdon tube, integral with the system of capillary 4 and bulb 3. The tube is positioned over a predetermined range in accordance with the temperature variation to which bulb 3 is exposed. A fluid pressure relay is mechanically actuated by the tube to establish a fluid pressure in pipe 6 representative of the tube deflection and, consequently, variation of temperature to which bulb 3 is exposed.

Without benefit of the novel relay structure to be disclosed, pipes 6 and 6A would be regarded as transmitting the telemetered pressure of transmitter 5 to standardizing relay 7. Relay 7 has been diagrammatically illustrated as of the type forming the subject matter of Gorrie S. N. 311,098, filed September 23, 1952, which issued January 8, 1957, as Patent 2,776,669. With an input pressure established in relay 7, by way of pipe 6A, an output pressure is established in pipe 8 which determines the position of valve 2.

Relay 7 is adapted to establish a fluid pressure which will progressively increase or decrease if its input departs from a predetermined value. The pressures in pipe 8 may be manually controlled through a selector valve mechanism 9 which is assumed to take the form of structure disclosed in Dickey et al. S. N. 251,406, filed October 15, 1951, which issued January 3, 1956, as Patent 2,729,222.

Attention can now be concentrated on relay structure 10, connected by pipes 6 and 6A between transmitter 5 and standardizing relay 7. The general function of relay 10 is to impart particularly desired characteristics to the fluid pressure ultimately imposed on valve 2. Although relay 10 is located, in the disclosed system, between transmitter 5 and relay 7, it is to be understood that its usage is so flexible it can be included at other points in this particular, and other, systems.

Somewhat more specifically, relay 10 is intended to function so as to superimpose upon an input pressure to itself a temporary, or momentary, loading pressure which corresponds, or is proportional in magnitude, to the rate at which the input pressure changes. As indicated supra, the relay functions to maintain a constant output if the input pressure is not changing. Without a changing input, the relay merely acts to transmit the value of the loading pressure of the input to its output. From another viewpoint, the agent controlled by relay 10 is varied in accordance with the first derivative of the magnitude of the condition detected with respect to time, or, in accordance with the rate of change in the magnitude of the condition. The practical result of this function of the invention is to correct the application of the agent to the condition before material change in the magnitude of the condition has occurred. And, from still another viewpoint, changes in the magnitude of the condition are momentarily amplified in an effect which adjusts the application of the agent before the magnitude of the condition has made an appreciable departure from a desired value.

Referring specifically to the elements of the structure of relay 10, it is appreciated, in Fig. 1, that sufficient sectioning has been utilized in this elevation view to expose the cooperating parts internal of relay 10. First observe that pipe 6 is supplying the input pressure to a specific chamber of the relay. Pipe 6A has the output pressure of the relay established therein from a specific chamber of the relay. A basic fluid pressure supply to the relay is brought to a specific chamber of the relay by pipe 20. This basic fluid pressure supply is clean, dry, compressed air at a substantially constant pressure.

The specific chambers of relay 10 have been designated 21—25. Chambers 21 and 22 are separated by rigid wall 26. Chamber 23 is separted from chambers 21 and 22 by rigid wall 27 in which flexible pivot diaphragms are located. Chambers 22 and 24 are separated by bellows 28. Chamber 25 is formed by bellows 29, itself located within chamber 24 so as to provide a wall imparting a force on the expansible wall of bellows 29.

Chamber 22 is the specific chamber receiving the input fluid loading pressure of pipe 6. The pressure established within chamber 22 imparts an initial force to bellows 28 as the movable, separating, wall of chambers 22 and 24.

With a force developed in chamber 22, and resulting movement of its expansible wall, the motion of this wall in establishing a pressure in chamber 21 is to be next appreciated. The mechanical motion of bellows 28 is transmitted through flexible diaphragm 30 and flexible diaphragm 31 to the valving mechanism in chamber 21. Specifically, pushrod 32 is attached to bellows 28 to angularly move arm 33, to longitudinally move link 34, and to angularly move tubular arm 35. Tubular arm 35 actuates the valve mechanism in chamber 21 to establish the amplified output pressure therein.

Tubular arm 35 has passage 36 therethrough connecting chamber 23 with valve seat 37. The constant fluid pressure supply of pipe 20 is established in chamber 23 from which it may be valved into chamber 21 by tubular arm 35 cooperating seat 37 with valve 38.

Valve 38 is mounted on a stem common with valve 39, cooperating with seat 40, to vent chamber 21 to atmosphere in accordance with the actuation by arm 35. Thus the valve system 37—40 provides a basic source of fluid pressure for chamber 21 and a means of relieving this pressure to atmosphere. The pressure established in chamber 21 by manipulation of this valve system, through arm 35, then appears in pipe 6A and passage 41.

Passage 41, together with passages 42 and 44, form connections between chamber 21 and chambers 24 and 25. A needle valve 43 is established between passages 41 and 42 to restrict the chamber 21 pressure into chamber 24. Chamber 21 pressure is, by means of passages 41 and 44, placed directly into chamber 25, formed by bellows 29. Spring 45 is attached to the expansible wall of bellows 28 in order to adjust valve seat 37 and valve 38 to closure when the pressure in chamber 22 is at a predetermined value within its range.

The fluid pressure passages between chambers 21, 24 and 25 are included in structure for opposing the force of chamber 22. The results of opposing this force of chamber 22, by this disclosed structure, achieves the desired modification of the pressure established in pipe 6A.

With adjustable needle valve 43 wide open, and passages 41, 42 and 44 having no restriction, relay 10 is essentially a 1 to 1 repeating relay. The input pressure within chamber 22 exerts a force on bellows 28 which is opposed by the force exerted by the pressures established in chambers 24 and 25. As the areas of chambers 24 and 25, acting upwardly on the underside of bellows 28 equal the area of chamber 22 acting downwardly on bellows 28, every input pressure established in chamber 22 causes valve system 37—38 to establish a pressure in chamber 21 and chambers 24 and 25 which is equal to that of chamber 22.

If needle valve 43 is completely closed, a greater pressure will have to be developed in chamber 21, and chamber 25, to balance the pressure in input chamber 22. The ratio of these pressures is determined by the ratio of the size of bellows 29 to bellows 28. The actual reduction to practice made of the invention utilizes a ratio of sizes for bellows 28 and 29 which will give a ratio of output to input change of approximately 10 to 1.

Going from the extreme settings for valve 43, relay 10 is seen as normally modifying the input pressure of pipe 6 by an intermediate adjustment of valve 43. In adjusting valve 43, the over-all response of the system in which relay 10 is included must be taken into account. It may be said that the speed of the system response determines a setting for 43 which will momentarily amplify changes in the input pressure of pipe 6.

Making the specific assumption of an increasing input pressure into chamber 22, the relay 10 functions to establish an output pressure in chamber 21 which is momentarily greater than that in chamber 22. The pressure developed in chamber 21 is directly applied to the bellows of chamber 25, to partially balance the force of chamber 22 across bellows 28. Valve 43 is adjusted to establish the rate at which the pressure in chamber 24 increases its contribution to the balance of the chamber 22 force. And the result is that the initial input pressure and the output pressure established have a momentary ratio deviating from 1 to 1, the output rising to a value larger than the input.

When the input pressure into chamber 22 decreases, relay 10 functions, in accordance with the principle outlined above. The pressure in chamber 25 is relieved quickly while the pressure in chamber 24 is restricted through valve 43. The result is a venting of chamber 21 to atmosphere and a deviation of the pressure ratio between chambers 21 and 22 from 1 to 1 to emphasize the output in the direction of change in the decreasing input.

Therefore, regardless of whether the rate of change of the input pressure increases or decreases, the output pressure in chamber 21 is emphasized in the direction of the change. Thus the control system including relay 10 has its otherwise proportionately established control pressure modified momentarily upon a change in the rate of change of the condition detected and controlled by the system. Control over the magnitude of the condition is improved by the system receiving a predetermined emphasis to the control effect produced by the deviating condition itself.

Reference may now be made to Figs. 2–5 which disclose the preferred form of an actual reduction to practice of relay 10. Due to the fact that the structure of this relay is extremely compact, liberal use has been made of sectional views to depict the relationship of the various elements internal of the housing of relay 10. In comparing the structure of Fig. 1 with that of Figs. 2–5, it is obvious that only certain elements of the relay structure have been given forms which vary between the two embodiments.

The principal deviation comes in the mechanical link from bellows 28 to the valve structure in chamber 21. In Figs. 2–5 the linkage 33—35, of Fig. 1, is embodied in a unitary, rigid, member. This rigid, U-shaped, member extends between chambers 21 and 22, through chamber 23 by means of flexible diaphragms 30 and 31, in general, the same as in Fig. 1.

Figs. 1–5 additionally depict a specific, practical form for valve 43 and a filter arrangement for the basic air supply of pipe 20 into chamber 23.

What I claim as new, and desire to secure by Letters Patent of the United States, is:

1. A control system for a condition including a structure containing a variable condition, a source for an agent which will vary the magnitude of the condition, detection means for the condition in the structure which will establish a fluid pressure proportional to the magnitude of the condition and having a relay comprising an expansible-contractible first chamber receiving the fluid pressure proportional to the magnitude of the condition; a source of constant fluid pressure; a combined supply and waste valve mechanically positioned by the movable wall of the first chamber; a second chamber of fixed volume for the valve system comprising the supply and waste valve, the supply part of said valve arranged to regulate admission of supply pressure fluid from the source to the fixed volume second chamber, the waste part of said valve arranged to regulate fluid pressure from the second fixed volume chamber to the atmosphere, with neither of the supply and waste valve parts being opened at the same time; an expansible-contractible third chamber connected to the first chamber and having a movable wall opposing the positioning of the supply and waste valve by the pressure in the first chamber; an expansible-contractible means positioned within the third chamber to act on the movable wall in opposition to the pressure in the first chamber; and an unrestricted passage means connecting the expansible-contractible means with the fixed volume second chamber.

2. A fluid pressure amplifier including: a first chamber receiving the fluid pressure to be amplified and including, a flexible wall, and an expansible wall; a source of constant fluid pressure; a second chamber supplying the amplifier fluid pressure and including, a flexible wall, a first valve venting the chamber to atmosphere, and a second valve connected to the first valve, the valves arranged to vent the second chamber either to atmosphere or to the constant source of fluid pressure; mechanical linkage connecting the expansible wall of the first chamber with the valves of the second chamber through the flexible walls of the chambers as pivots and having a passage through a portion of the linkage communicating the second chamber with the constant source of fluid pressure through the second valve, a third chamber restrictively connected to the second chamber and having an expansible wall common with that of the first chamber, and an expansible fourth chamber within the third chamber and acting in the same direction as the third chamber on the expansible wall and connected directly with the second chamber.

3. A fluid pressure amplifier including: a first chamber receiving the fluid pressure to be amplified and including, a flexible wall, and an expansible wall; a source of constant fluid pressure; a second chamber supplying the amplifier fluid pressure and including, a flexible wall, a first valve venting the second chamber to atmosphere, and a second valve connected to the first valve, the valves arranged to vent the second chamber either to atmosphere or to the constant source of fluid pressure; mechanical linkage including a rigid U-shaped member, one leg of which is tubular and extends from the source of constant fluid pressure to the seat of the second valve connecting the expansible wall of the first chamber with the valves of the second chamber through the flexible walls of the chambers as pivots with said tubular leg communicating the second chamber with the constant source of fluid pressure through the second valve, a third chamber restrictively connected to the second chamber and having an expansible wall common with that of the first chamber, and an expansible fourth chamber within the third chamber acting in the same direction as the third chamber on the expansible wall and connected directly with the second chamber.

4. A pressure amplifier including; a first chamber supplied a substantially constant fluid pressure; a second chamber supplied the pressure to be amplified and including, a flexible wall, and an expansible wall restrained by a spring; a third chamber supplying the amplified fluid pressure and including, a flexible wall, a first valve venting the third chamber to atmosphere, and a second valve venting the first chamber to the third chamber; mechanical linkage connecting the expansible wall of the second chamber with both valves through the flexible walls of the chambers as pivots; a fourth chamber supplied the amplified fluid pressure and including, the expansible wall of the second chamber, a restriction for the amplified fluid pressure; and a fifth chamber supplied the amplified fluid pressure and including, an expansible wall acting on the expansible wall of the second and fourth chambers.

5. A pressure amplifier including; a first chamber supplied a substantially constant fluid pressure; a second chamber supplied the pressure to be amplified and including, a flexible wall, and a resiliently restrained expansible wall; a third chamber supplying the amplified fluid pressure and including, a flexible wall, a first valve venting the third chamber to atmosphere, and a second valve venting the first chamber to the third chamber; mechanical means operatively connecting the expansible wall of the second chamber with both valves; a fourth chamber supplied the amplified fluid pressure and including, the expansible wall of the second chamber, and a restriction for the amplified fluid pressure; and a fifth chamber supplied the amplified fluid pressure and including, an expansible wall acting on the expansible wall of the second and fourth chambers.

References Cited in the file of this patent

UNITED STATES PATENTS

| | | |
|---|---|---|
| 2,380,507 | Eaton | July 31, 1945 |
| 2,454,946 | Rosenberger | Nov. 30, 1948 |
| 2,461,026 | Bilyeu | Feb. 8, 1949 |
| 2,476,030 | Everington | July 12, 1949 |
| 2,737,963 | Gorrie | Mar. 13, 1956 |